United States Patent

[11] 3,627,619

| [72] | Inventor | Harold J. Fromm<br>Rochester, N.Y. |
|---|---|---|
| [21] | Appl. No. | 716,109 |
| [22] | Filed | Mar. 26, 1968 |
| [45] | Patented | Dec. 14, 1971 |
| [73] | Assignee | Eastman Kodak Company<br>Rochester, N.Y. |

[54] METHOD AND PRODUCT FOR IMPEDING DUPLICATION OF MICROFILM IMAGES
6 Claims, 6 Drawing Figs.

[52] U.S. Cl. .................................................. 161/3.5,
96/67, 96/87, 117/34, 161/1, 161/408
[51] Int. Cl. ...................................................... B44f 1/02,
G03c 1/78
[50] Field of Search............................................ 161/1, 2,
35.5, 409, 408; 96/15, 67, 87; 117/34, 159;
240/8.6; 250/126–128

[56] References Cited
UNITED STATES PATENTS

| 1,176,746 | 3/1916 | Federico | 161/3.5 |
| 1,627,468 | 5/1927 | Stitt | 161/33 |
| 2,605,205 | 7/1952 | Patterson et al. | 161/1 |
| 2,706,262 | 4/1955 | Barnes | 313/92 |
| 3,375,112 | 3/1968 | Theodorou | 96/67 |
| 3,411,910 | 11/1968 | Crawford et al. | 96/85 |

*Primary Examiner*—John T. Goolkasian
*Assistant Examiner*—M. E. McCamish
*Attorneys*—Robert W. Hampton and John D. Husser ABSTRACT: Transparent spacer element or elements, and a light-dispersing medium are affixed to an image-bearing microfilm in a manner such that a contact copy film placed on either side of the film composite will necessarily be spaced from the image layer of the microfilm and the light-dispersing medium. The transparent spacer element or elements are of sufficient thickness that contact copies made with diffuse light are not suitable for normal uses. The size, concentration and location of the light-scattering centers in the light-dispersing medium are such that "no-light" areas or shadows, of size sufficient to substantially degrade the legibility of projection viewing, will be formed on any film contact copied therefrom with specular light.

PATENTED DEC 14 1971   3,627,619

HAROLD J. FROMM
INVENTOR.

BY *John W. Husser*
*Robert W. Hampton*
ATTORNEYS

METHOD AND PRODUCT FOR IMPEDING DUPLICATION OF MICROFILM IMAGES

BACKGROUND OF INVENTION

Field of Invention

This invention relates to art of image-projection and copying of film and more particularly to a method and product for discouraging unauthorized contact copying of microfilm images while maintaining the film suitable for normal projection viewing and copying uses.

Description of Prior Art

Microfilms have heretofore been designed with one aim being to facilitate the contact-copying of a microimage recorded thereon through many generations, with a minimum loss in quality and legibility of the microimage.

In recent years, microfilm has been used as a medium for publishing books, reports, catalogs and other such information having a market value to interested users. Microfilm is ideally suited to the publication field because a large amount of information can be condensed into a small area, duplicated by contact-copying and sold at a relatively inexpensive price compared with other forms of publication. However, the low cost of duplication is also a disadvantage to the distributor of such conventional microfilm publications because once he has sold one of the microfilm publications, individuals can unauthorizedly duplicate the microfilm for resale by use of the simple and inexpensive contact-copying procedures. It is, therefore, advantageous to provide a means for rendering such information-bearing film difficult for contact duplication while maintaining the film acceptable for all normal intended uses.

By one prior art technique commercial microforms of high-reduction ratios (e.g., 200:1) are provided to individuals with a transparent sheet approximately 0.005 inches thick laminated to the emulsion side of the photosensitive film to protect the microimages from dust, dirt and scratches. Because of the extremely small size of the microimage, a spacing of 0.005 inch between the layer bearing the microimage and the photosensitive layer of the duplicating material is adequate to prevent unauthorized duplication with either diffuse or specular light. Such a separation of 0.005 inch is not adequate to prevent duplication of microimages which are produced at low-reduction ratios used in most common microfilm procedures, such as, e.g., 24:1. This is particularly the case with contact-copying procedures utilizing specular light. If image diffusion by the laminate was relied on to prevent specular-light duplication of such low-reduction microfilms, laminates of thickness greater than 0.040 inch would be required. Such a transparent sheet laminated over the emulsion would be undesirable because it would greatly reduce the storage capacity of the microfilm file.

In can therefore be seen that a problem exists in preventing unauthorized specular and diffuse light contact printing of low-reduction microfilm, while maintaining proper size, quality and legibility of the microfilm for normal intended uses in projection readers and printers.

SUMMARY OF THE INVENTION

The present invention affords a method and product for substantially impending, i.e. hindering or interfering with the progress of, such unauthorized duplication of low-reduction microfilm. Briefly described, one embodiment of the present invention comprises a microfilm-laminate composite including a stratum therein having predetermined light-dispersing characteristics. The light-dispersing medium is located in the microfilm-laminate composite in a manner such that the stratum is spaced from a copy-film placed in contact with the composite. Because of the spaced relation between the light-dispersing stratum and the photosensitive portion of any copy-film, shadow or no light areas are created on the copy-film during any attempted duplication with specular illumination sources. By selection of light-dispersing medium with light-scattering centers of proper size and concentration and proper location of the light-dispersing medium, the microfilm-laminate composite can be constructed to afford good image quality during use in projection viewers or projection copiers, but form contact copy images with no-light or shadow areas which render any contact copy film made therefrom unacceptable for the same normal uses. Therefore, by the use of such a light-scattering stratum in combination with spacer elements of sufficient thickness to prevent contact copying with diffused light, a film composite is provided which impedes unauthorized copying but which is not to so thick as to hinder the storage advantages of the microfilm.

It is therefore an object of the present invention to provide a projectable information element which is suitable for normal intended uses but which substantially impedes unauthorized duplication.

It is another object of this invention to provide an improved projectable information element which is compact and suitable for normal uses but which substantially impedes unauthorized duplication.

Another object is to provide an improved projectable information element which affords a substantial protection against unauthorized duplication.

Yet another object of the present invention is to provide an image-bearing microfilm, of the low-reduction type, which allows normal uses such as projection viewing and copying but which will render contact-copies made therefrom by either diffuse or specular light, unacceptable for the same normal uses.

BRIEF DESCRIPTION OF DRAWINGS

The above, as well as other objects and advantages of the present invention, will become apparent to those skilled in the art from the following description with reference to the drawings in which like characters denote like parts and wherein.

DESCRIPTION OF PREFERRED EMBODIMENTS

As pointed out above, the present invention is intended for use with projectable information elements and has as one purpose the substantial impeding of unauthorized contact-copying of the information elements.

The term "projectable information element" is used herein to refer to elements for producing images when light is directed therethrough and is intended to include elements with image patterns formed by silver, diazo, minute bubbles and other analogous formations in a light transmissive medium.

The term "contact-copying" is used herein to refer to copying procedures wherein a photosensitive material is placed in contact or in near-contact with a projectable information element and exposed through that element with light. The terms "contact-copy" and "contact-image" refer to copies or images made by contact copying as opposed to copies and images made by focusing an image projected from an information element onto photosensitive material.

The phrase "impede contact-copying" as used herein with reference to a projectable information element or image-bearing laminate composite is intended to refer to hindering or interfering with the progress of contact-copying of such element or composite to the extent of rendering the contact-copy or contact-image unacceptable for normal viewing.

Figure 1:
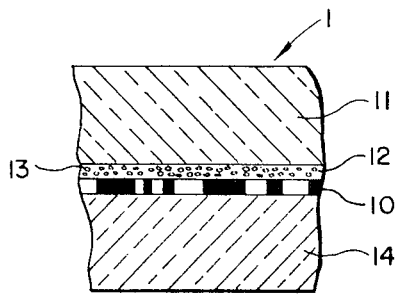
FIG. 1 is a fragmentary cross section of an information element in accordance with one embodiment of the present invention.

By referring to FIG. 1, a fragmentary section of an information element 1, one embodiment of the present invention can be seen. In FIG. 1, the image layer of stratum 10 is a photographic emulsion containing a developed-silver image pattern. The image in this instance was formed at a 24:1 reduction ratio which is common for microfilm usage. The dimensions of the information elements hereinafter described are desirable for use with images of a 24:1 reduction ratio; however, it will be appreciated that the novel concept of this invention is operable with information elements having images of other reduction ratios and that dimensions of various parts of the novel information elements disclosed herein can be varied within the scope of this invention according to the teachings hereinafter set forth to obtain the desired results of this invention with images of other reduction ratios.

In FIG. 1, the image layer 10 of element 1 is bonded to a film support 11 by a bonding layer 12. In this embodiment the film support is desirable of a thickness of 0.01 inch and the bonding layer 0.0001 inches in thickness. Laminated onto the opposite side of the image layer 10 from support 11 is a transparent support 14 which is desirably 0.010 inches in thickness.

Throughout the bonding layer 12, which has been exaggerated in thickness in the drawing for illustrative purposes, are a plurality of light-scattering centers 13. The bonding layer 12 and scattering centers 13 are coextensive with the image layer 10 so that specular light passing through the image layer 10 from either side of the information element 1 will pass through the light-dispersing medium formed by bonding layer 12 and its scattering centers 13.

As pointed out above, the image layer 10 can be other than a silver emulsion. Various other image layers such as diazo, Kalvar, dye, photoresist, photochromic, electrostatic etches and mechanically printed materials can be used.

The film support 11 and support 14 can be formed of any relatively clear support material. Typical support materials used in the photographic industry include cellulose esters such as acetates, nitrates, proprionates, butyrates, polycarbonates, polyethylene, polypropylene, polyesters such as polyethylene, terephathalate and glass. Preferred supports for this invention are cellulose acetate and polyethylene terephathalate.

In the light-dispersing medium of the embodiment shown in FIG. 1, oil dispersions form the light-scattering centers 13 in a gelatin bonding layer 12. When the light-dispersing medium is located near the image layer 10 as shown in FIG. 1, i.e., separated from each external surface of the information element 1 by approximately from 0.009 inch to 0.01 inch, it has been found desirable to use scattering particles having a diameter of about two-four microns. When particles of this size are located as shown in FIG. 1, a concentration of about 15,000 per square millimeter has been found desirable to accomplish the desired scattering effect on specular light passing through the light-dispersing medium.

Figure 2:
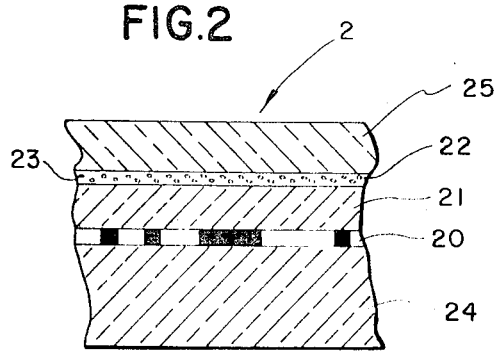
FIG. 2 is a fragmentary cross section of an information element in accordance with another embodiment of the present invention.
Figure 3:
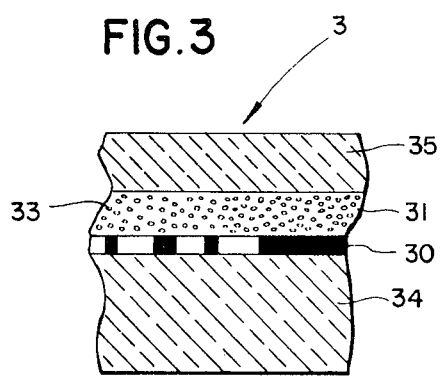
FIG. 3 is a fragmentary cross section of an information element in accordance with yet another embodiment of the present invention.
Figure 4:
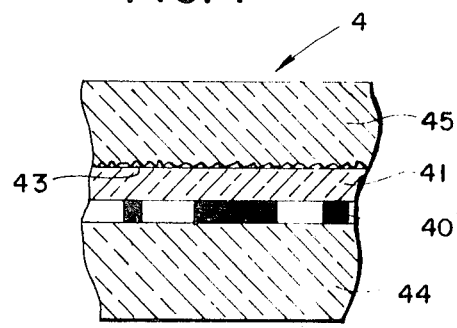
FIG. 4 is a fragmentary cross section of an information element in accordance with still another embodiment of the present invention.

As will be evident from a brief reference to FIGS. 2–4, the location of the light-dispersing medium within information elements of the present invention can vary. The embodiments of FIGS. 2–4 will be further described below; however, it is to be noted in this discussion that the location of the dispersing medium in information elements embodying the present invention should desirably be spaced some distance from each external surface of the element and that the size of the scattering centers which will effect proper light dispersion varies inversely with spacing between the stratum of scattering centers and the nearest external surface of the information element.

The further the light-scattering centers or particles are spaced from a possible situs for a copy material, the smaller they may be to accomplish their intended effect, that is, to scatter specular light to degrade the photographic image produced by specular illumination. They do not interfere with diffuse light used for viewing in the conventional manner. A layer of scattering particles separated some 0.005 inch from the copy situs should contain larger particles by virtue of the geometry of the system than a layer of scattering particles located 0.01 inch from the copy situs.

Various other light-dispersing media are operable in the present invention. Acetate diffusion sheets containing $SiO_2$ particles of proper size and concentration is one example of such other media. Other transparent particles which will act as minute lenses, breaking up the uniformity of specular light exposing beam, can be dispersed in gelatin or other nonsolvent material and will be operable in the present invention. Also, a support surface which will be within the information element after lamination can be mechanically roughened or etched to provide the desired light-scattering characteristics.

FIGS. 2–4 show fragmentary cross sections of other exemplary embodiments of the present invention which vary within the general principles of the invention discussed above.

In FIG. 2, the information element 2 comprises an image layer 20 formed of one of the image materials described above and attached to a transparent film support 21. As in FIG. 1, a 0.01 inch transparent support 24 is laminated on the surface of the image layer 20 opposite support 21. However, in this embodiment the support 21 is only 0.005 inch in thickness and a 0.001 inch acetate diffusion sheet 22 having light-scattering particles 23 dispersed therein is laminated between the support 21 and another 0.004 inch transparent support 25. As pointed out above, the light-scattering particles 23 forming the light-dispersing medium of element 2 are larger than those of FIG. 1 in accordance with the outward spacing from the image layer 20.

In FIG. 3, the information element 3 comprises an image layer 30 of the general type described above carried on a film support 31 which is 0.005 inch in thickness. However, in this embodiment, the light-scattering particles 33 are dispersed in the film support 31. The transparent support 34 laminated to the image layer 30 is again 0.01 inch in thickness. The transparent support 35 is in this instance 0.005 inch in thickness so that a total spacing of approximately 0.01 inch again exists on each side of the image layer 30.

In FIG. 4, the image layer 40 is attached on one surface to a 0.004 inch transparent film support 41 and has a 0.01 inch transparent support 44 laminated on the other surface thereof. In this embodiment, a 0.006 inch transparent support 45 has a roughened surface 43 which, when laminated to the support 41 as shown in FIG. 4, provides the light dispersing medium for the information element 4.

Figure 5:
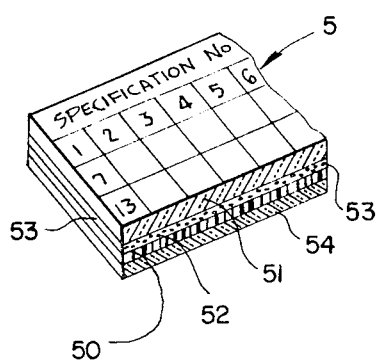
FIG. 5 is a perspective of one type of information element which can embody the present invention, with the thickness dimension of film card greatly enlarged for purpose of illustration.

FIG. 5 discloses a typical information element which is constructed utilizing the principals of the present invention disclosed above. The image layer 50 of information element 5 contains image patterns arranged in the format of a microfiche of filmcard such as commonly used in the microfilm art. The information element 5 is constructed in the same arrangement as described with respect to FIG. 1. It can be seen that a 0.0001 inch bonding layer 52 containing light dispersing particles 53 joins the image layer 50 and the transparent 0.01 inch film support 51. A transparent support 54 of 0.01 inch thickness is laminated to the opposite side of the image layer 50 from film support 51.

Figure 6:
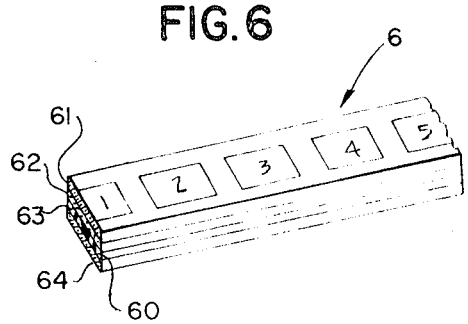
FIG. 6 is a perspective of another type of information element embodying the present invention, with the thickness dimension similarly enlarged.

FIG. 6 discloses a trip information element 6 embodying the present invention. The image layer 60 contains images arranged in a strip format as shown, such as is commonly used in strip microfilm apparatus. The image layer 60 of element 6 is bonded to a 0.01 inch film support 61 by a 0.0001 inch bonding layer 62. The bonding layer 62 contains light-scattering particles 63 such as in the analogous layers of FIGS. 1 and 5. Again, a 0.01 inch transparent support 64 is laminated to the image layer 60 opposite support 61.

Having described various embodiments of the present invention, a brief explanation of how the embodiments disclosed in FIGS. 1–6, as well as other information elements embodying the present invention, impede unauthorized duplication will be set forth with reference to FIG. 1.

As mentioned above, contact-copying can be accomplished by diffuse or specular light so that the present invention provides means to impede duplication by both techniques. As seen in FIG. 1, a photosensitive surface placed in contact with either exterior surface of information element 1, will necessarily be spaced at least 0.01 inch from the image layer 10. If the photosensitive surface is then exposed by diffuse light through the information element 1 to copy the information thereon, one of the transparent supports 11 or 14 will sufficiently diffuse the image projected from the layer 10 so that the image recorded on the photosensitive layer will not be suitable, i.e., sufficiently legible, for normal projection viewing or copying.

If, on the other hand, the photosensitive copy material is exposed through information element 1 by specular light, the light-scattering particles 13 will form no light or shadow areas on the copy material which render the recorded image unacceptable of normal projection viewing or copying.

When, however, it is desired to project the image of information element 1 with diffuse light through a lens and onto a viewing screen or copy sheet as in normal projection uses, the image viewed or recorded from the element 1 is quite acceptable. It will therefore be appreciated that the present invention provides an information element which can be advantageously used to substantially impede contact copying of information thereon while maintaining the information thereon readily accessible in suitable form for authorized uses. Such an information element can of course be constructed using laminating procedures which prevent separation of the layers without serious damage to the image quality.

The invention has been described with particular reference to preferred embodiments thereof, but it will be understood by those skilled in the art that variations and modifications can be effected within the scope and spirit of the invention as described hereinabove and as defined in the appended claims.

I claim:

1. An image-bearing laminate comprising adapted to impede contact-copying of the composite image by diffuse and specular light but which permits projection viewing and projection copying of such image, said composite comprising:
    a pair of transparent support layers arranged in spaced relation;
    a light projectable image-bearing layer located between said pair of support layers;
    means defining a specular light-dispersing layer located between a first of said pair of support layers and said image-bearing layer for dispersing specular light projected through said composite to impede contact-copying by such light; and
    each of said pair of support layers having an internal and external surface, said external surfaces respectively being spaced from said image-bearing layer a predetermined distance such that diffuse light projected through said composite is diffused to impede contact-copying thereby.

2. A composite as recited in claim 1, wherein said specular light-dispersing layer comprises:
    a plurality of spaced light-scattering centers; and
    a transparent bonding layer, said bonding layer containing said centers and being laminated to said internal surface of said first support layer.

3. A composite as recited in claim 2, wherein said image-bearing layer has opposed sides respectively laminated to said bonding layer and said internal surface of a second of said pair of support layers.

4. A composite as recited in claim 1, wherein said specular light-dispersing layer comprises:
    a stratum located on said internal surface of said first support layer, said stratum being textured for dispersing specular light projected through said composite to impede contact-copying by such light.

5. An image-bearing laminate composite adapted to impede contact-copying of the composite image by diffuse and specular light but which permits projection viewing and projection copying of such image, said composite comprising:
    a light projectable image-bearing layer;
    first and second transparent support layers respectively of dimensions at least coextensive with said image-bearing layer, said first and second support layers being arranged in spaced relation with said image-bearing layer disposed therebetween;
    each of said first and second support layers having an external surface respectively spaced from said image-bearing layer a predetermine distance such that diffuse light projected through said composite is diffused to impede contact-copying thereby; and
    means, disposed between said exterior surfaces of said first and second support layers and being of dimensions at least coextensive with said image-bearing layer, for dispersing specular light projected through said composite to impede contact-copying by such light.

6. A composite as recited in claim 5, wherein said specular light dispersing means comprises:
    a plurality of spaced light-scattering centers; and
    a transparent bonding layer of dimensions at least coextensive with said image-bearing layer, said bonding layer containing said centers.

* * * * *